United States Patent [19]

Tabata et al.

[11] Patent Number: 4,658,349

[45] Date of Patent: Apr. 14, 1987

[54] DIRECT MEMORY ACCESS CONTROL CIRCUIT AND DATA PROCESSING SYSTEM USING SAID CIRCUIT

[75] Inventors: Kuniaki Tabata, Hinodemachi; Tetsuo Machida, Machida; Kazuaki Ohya, Yokohama, all of Japan

[73] Assignee: Hitachi, Ltd., Tokyo, Japan

[21] Appl. No.: 639,527

[22] Filed: Aug. 9, 1984

Related U.S. Application Data

[63] Continuation of Ser. No. 274,178, Jun. 16, 1981, abandoned.

[30] Foreign Application Priority Data

Jul. 4, 1980 [JP] Japan .................................. 55-90652

[51] Int. Cl.[4] ............................................ G06F 13/28
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,573,855 | 4/1971 | Cragon et al. | 364/200 |
| 3,638,195 | 1/1972 | Brender et al. | 364/200 |
| 3,903,510 | 9/1975 | Zobel | 364/900 |
| 4,035,777 | 7/1977 | Moreton | 364/200 |
| 4,056,853 | 11/1977 | Bishop et al. | 364/200 |
| 4,125,870 | 11/1978 | Suzuki et al. | 364/900 |
| 4,169,289 | 9/1979 | Shively | 364/900 |
| 4,181,936 | 1/1980 | Kober | 364/200 |
| 4,202,035 | 5/1980 | Lane | 364/200 |
| 4,215,400 | 7/1980 | Denko | 364/200 |
| 4,298,932 | 11/1981 | Sams | 364/200 |

OTHER PUBLICATIONS

"Build a Microcomputer–Chapter VII Direct Memory Access," by Advanced Micro Devices, Inc., 1978, pp. 1–18.
"MCS-80/85 Family User's Manual," by Intel Corporation, 1979, pp. 6-115 to 6-131.
Knuth, The Art of Computer Programming, Second ed.; vol. 1, Addison-Wesley, 1973, pp. 240–248.
The 8080/8085 Microprocessor Book; John Wiley and Sons, 1980, pp. 207–215.
Wakerly; Microcomputer Architecture and Programming, John Wiley and Sons 1981, pp. 63–68, 340–344.

Primary Examiner—Archie E. Williams
Assistant Examiner—David L. Clark
Attorney, Agent, or Firm—Antonelli, Terry & Wands

[57] ABSTRACT

A direct memory access control circuit equipped with a first register for storing the top address of a memory area, a second register for storing the bottom address of that memory area, a comparison circuit for comparing the current address used for memory access with the bottom address stored in the second register, and a control circuit for replacing the current address, which is to be subsequently used for memory access, with the top address stored in the first register when coincidence is detected by the comparison circuit.

13 Claims, 9 Drawing Figures

FIG. 3a
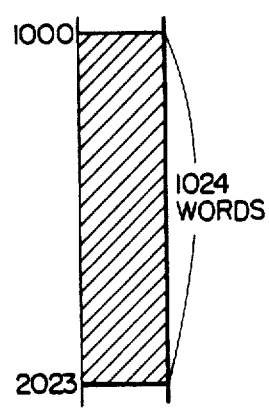
FIG. 3b
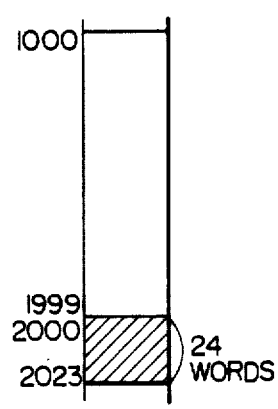
FIG. 3c
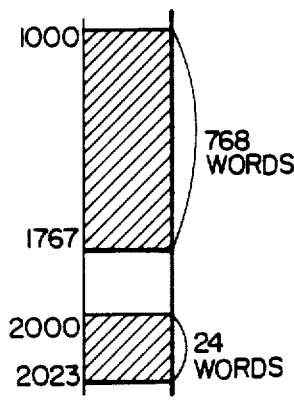
FIG. 3d
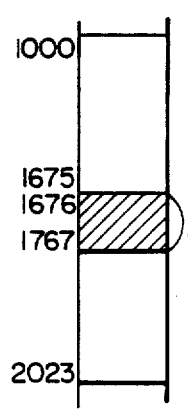
FIG. 3e
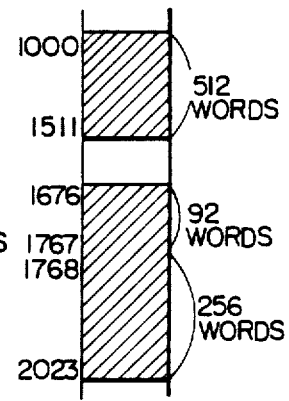
FIG. 3f
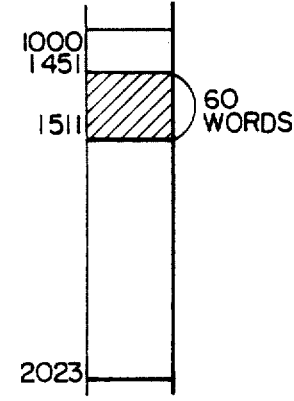
FIG. 4
|  | (a) | (b) | (c) | (d) | (e) | (f) |
|---|---|---|---|---|---|---|
| ASSOCIATED DMA CKT | 40A | 40B | 40A | 40B | 40A | 40B |
| TRANSFER BEGINING ADDRESS (BGN) | 1000 | 1000 | 1000 | 2000 | 1768 | 1676 |
| TRANSFERRED WORD NUMBER (W) | 1024 | 1000 | 768 | 700 | 768 | 800 |
| NON-TRANSFERRED WORD NUMBER (W) | 1024 | 24 | 792 | 92 | 860 | 60 |

DIRECT MEMORY ACCESS CONTROL CIRCUIT AND DATA PROCESSING SYSTEM USING SAID CIRCUIT

This application is a continuation of application Ser. No. 274,178, filed June 16, 1981 now abandoned.

FIELD OF THE INVENTION

This invention relates to a direct memory access control circuit for effecting data transmission between a buffer memory to be used by a processor and associated terminals, and also to a data processing system capable of transmitting data at high speed between two terminals having different transmission data lengths via a data buffer memory.

BACKGROUND OF THE INVENTION

As means for transmitting data at a high speed between a plurality of terminals by way of a data buffer memory, a direct memory access control circuit (hereinafter called a "DMA circuit") has heretofore been known for controlling such transmission. In such a system, when data is to be transferred from a first terminal to a second terminal, a DMA circuit dedicated to the first terminal controls transfer of the data to a prescribed storage area of a buffer memory, and then, another DMA circuit dedicated to the second terminal controls transfer of that data from the buffer memory to the second terminal. This is accomplished with minimum control from the processor in the system thereby permitting the processor to perform other tasks during the data transmission, thereby contributing to a higher system processing speed.

However, where the sector lengths of the transmitting and receiving terminals are different from each other, unless the respective sector lengths are even multiples of one another, the conventional DMA circuits will not be able to transfer all of the data stored in the buffer memory to the receiving terminal in single transmission. Thus, data occupying a fraction of a sector length of the receiving terminal will remain. As a result, in the conventional system, the next data from the transmitting terminal can be transferred to the buffer memory, it has been necessary to first use the processor to shift this remaining data to the beginning of the storage area so that the data can be transferred out of memory in the proper sequence. Of course, such use of the processor naturally reduces the processing speed of the system.

SUMMARY OF THE INVENTION

In order to make it possible to transmit data exceeding the buffer area capacity at a high speed between the terminals, the present invention is directed to provision of a DMA circuit which is capable of first making access to that data which exists from the transmission start address, located somewhere between the top address and the bottom address of the buffer area, to the bottom address, and then transmitting that data which exists from this bottom address to the transmission end address located somewhere between the top address and the transmission start address.

To accomplish the abovementioned object, the direct memory access control circuit in accordance with the present invention is equipped with memory means for storing the top address of the memory, memory means for storing the bottom address, comparison means for comparing the current address which is now used for the memory access with the bottom address, and means for updating the address, which is to be subsequently used for the memory access, to the top address when coincidence is detected by the comparison means.

BRIEF DESCRIPTION OF THE DRAWINGS

FIGS. 3a-3f show examples of the data processing inside the buffer memory in the system of FIG. 2; and FIG. 4 is a table useful for explaining various information relating to the data processing of FIG. 3.

DESCRIPTION OF THE PREFERRED EMBODIMENTS

Figure 1:
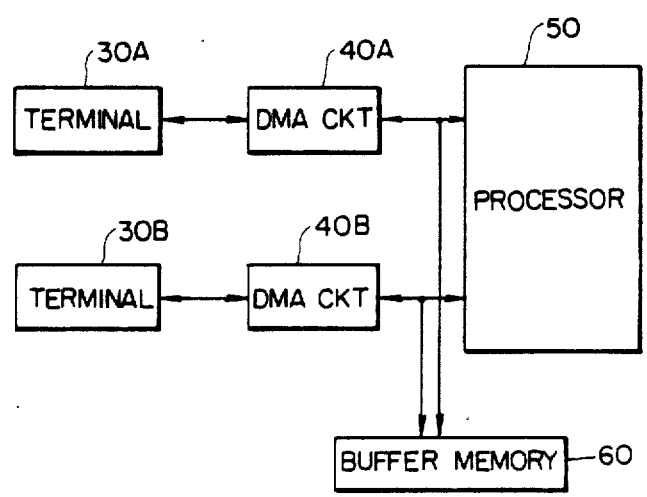
FIG. 1 is a block diagram of the conventional data processing system.

As depicted in FIG. 1, the terminals 30A and 30B are connected to the processor 50 and the buffer memory 60 via the DMA circuits 40A and 40B, respectively. When the data is transmitted from the terminal 30A to the terminal 30B, the DMA circuit 40A transmits the data, word by word, from the terminal 30A to the buffer memory 60. The transmitted data is sequentially stored in a predetermined buffer area inside the memory 60 beginning at its top address position. The total quantity of the data is so selected that it falls under the range of the area size and is equal to a word number which is some multiple of the sector length that is determined depending upon the terminal 30A. When storing of the data is completed, the DMA circuit 40B reads the data, word by word, from the buffer memory 60 and delivers the data to the terminal 30B. The data transmission from the buffer memory 60 to the terminal 30B by the DMA circuit 40B is effected word by word up to the word number which is some multiple of the sector length determined by the terminal 30B within the range that does not exceed the data quantity that has already been transmitted from the terminal 30A to the buffer memory 60.

When the data transmission by this DMA circuit 40B is completed, the DMA circuit 40A again transmits the subsequent data from the terminal 30A to the buffer memory 60. In this case, if the sector lengths for the terminals 30A and 30B are the same, all the data that has been sent from the terminal A to the buffer memory 60 is sent from the buffer memory 60 to the terminal B. Accordingly, the subsequent data may be stored, word by word, in the predetermined buffer area of the buffer memory 60 from its top address. Thereafter, the same procedures are repeated so that the data transmission is repeatedly effected from the terminals 30A to 30B via the buffer memory 60.

If the sector lengths for the terminals 30A and 30B are different from each other, however, all the data, that has been transmitted from the terminal 30A to the buffer memory 60, cannot be transmitted to the terminal 30B in the conventional DMA circuits. For this reason, untransmitted data exists in the buffer memory 60. If the subsequent data is to be again transmitted from the terminal 30A to the buffer memory 60 after completion of the data transmission from the buffer memory 60 to the terminal 30B, this untransmitted data must first be moved to an area starting from the top address of a predetermined buffer area inside the buffer memory 60 and the new data must then be transmitted from the terminal 30A in such a fashion that the new data is positioned next to the untransmitted data after their movement. Thus, in accordance with the prior art, the processor 50 must execute processing in order to move the untransmitted data within the buffer area if large quantities of data exceeding the buffer area capacity are to be transmitted between the terminals. In other words, the prior art involves the problem that the data transmission speed drops in such a case.

Figure 2:
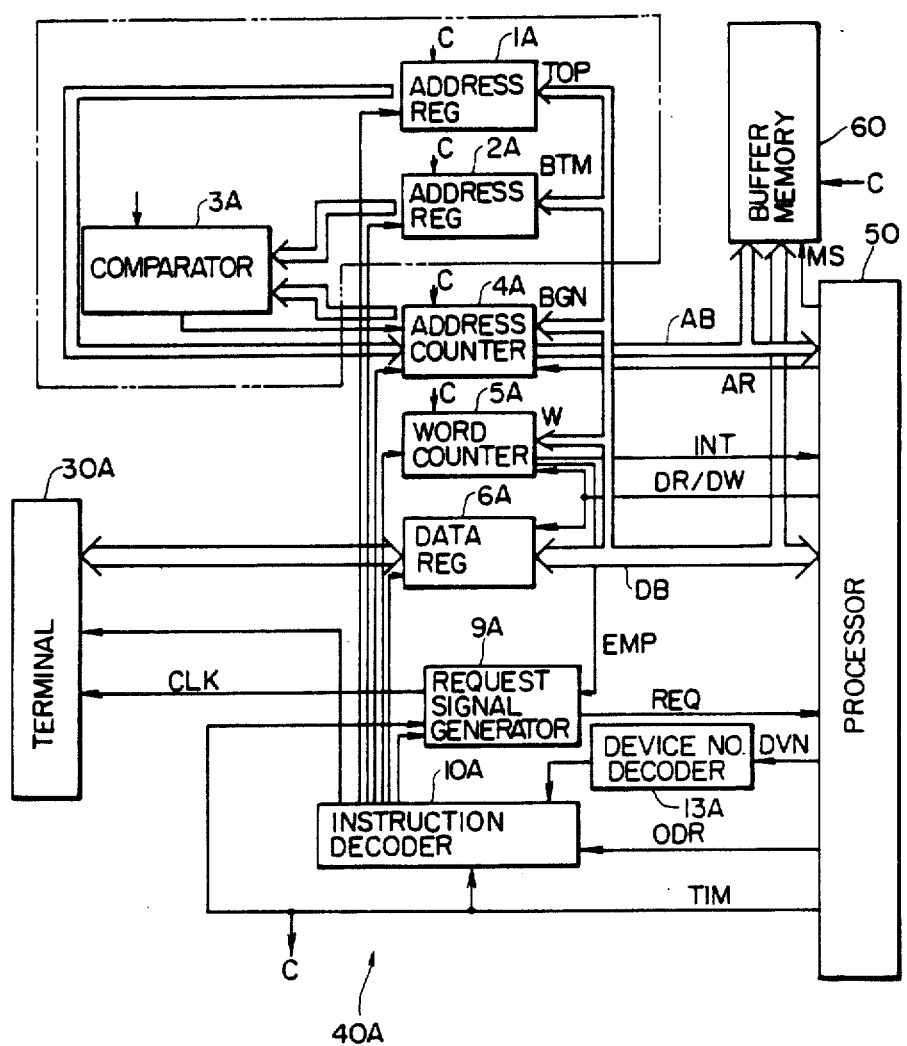
FIG. 2 is a block diagram of the data processing system in accordance with the present invention.

FIG. 2 shows a terminal 30A of the type used in FIG. 1, a processor 50 and a DMA circuit 40A in accordance with the present invention connecting the terminal 30A and the processor 50 to each other. Since the DMA circuit 40B, in accordance with the invention, is the same as the DMA circuit 40A in FIG. 2, its circuit diagram is not shown. The DMA circuit 40B is connected to signal lines (such as a data bus DB, an address bus AB, and the like) connecting the DMA circuit 40A to the processor 50 and the memory 60 in the same way as the DMA circuit 40A. Hereinafter, when the circuit portions of the DMA circuit 40B are mentioned, they are represented by reference numerals of the corresponding circuit portions of the DMA circuit 40A by replacing their suffixes A by B. Among the elements of the DMA circuit 40A shown in FIG. 2, the portion encircled by dash lines represents the portion that is added in accordance with the present invention, and the rest of the circuit elements are the same as those of the conventional DMA circuit.

In starting the DMA transmission between the terminal 30A and the processor 50, the processor 50 delivers a device number DVN designating the terminal 30A to a device number decoder 13A. The device number decoder 13A decodes the DVN and so controls an instruction decoder 10A as to allow its function only when the terminal 30A is designated. The top address TOP, the bottom address BTM, the transmission start address BGN and the transmission word number W in the DMA transmission are set into address registers 1A, 2A, and address counter 4A and a word counter 5A, respectively. This is effected when the processor 50 sequentially puts the values of TOP, BTM, BGN and W on the data bus and sends a predetermined instruction on line ODR corresponding to the setting of each register to the instruction decoder 10A. There are two modes in the data transmission, a READ mode (writing to the buffer memory 60) and a WRITE mode (reading from the buffer memory 60). Selection instruction of the WRITE/READ modes (mode selection: MS) to and from the buffer memory 60 is given to the buffer memory 60 by the processor 50.

When the start instruction of the DMA transmission is delivered from the processor 50 on the line ODR, the instruction decoder 10A decodes the instruction and actuates a request signal generator 9A. The request signal generator 9A sends a transmission demand signal REQ to the processor 50 at a suitable timing in response to a timing signal TIM given from the processor 50 and also sends a data transmission synchronizing signal CLK to the terminal 30A. The REQ and CLK signals are delivered from the request signal generator 9A whenever one word is transmitted after the start of the DMA transmission.

One word of data to be sent is applied from the terminal 30A to the data register 6A. This data is sent to the buffer memory 60 via the data bus DB and is stored at the address position given from the address counter 4A via the address bus AB. Whenever one word is transmitted, the word counter 5A is counted down while the address counter 4A is counted up. It is one of the characteristic features of the present invention that the value of the address counter 4A is compared with the address BTM in the address register 2A by the comparison circuit 3A and when they coincide with each other, the address TOP stored in the address register 1A is set into the address counter 4A and the subsequent data transmission is interrupted on the basis of this updated content of the address counter 4A. In this manner, the data of the top address can be transmitted in succession to the data of the bottom address of the buffer memory 60. The operation of the apparatus for transmitting the data from the terminal 30A to the terminal 30B will be described with reference to FIGS. 3 and 4.

It will be assumed that the buffer area has a 1024-word capacity in which the top address TOP is at the 1000-address and the bottom BTM is at the 2023-address, and the sector length is 256 words for the terminal 30A and 100 words for the terminal 30B. In other words, the data transmission between the terminal 30A and the processor 50 is effected using a unit which is some multiple of 256 words while the data transmission between the terminal 30B and the processor is effected in a unit which is some multiple of 100 words.

(1) As the initial state, the whole content of the buffer area is cleared. First, the data from the terminal 30A is taken into the buffer. Since the 1024-word capacity of the buffer area is a multiple of the 256-word sector length of the terminal 30A, the 1024-word data is taken from the terminal 30A into the buffer area from its 1000-address to its 2023-address. Accordingly, the processor 50 executes the following processing from the DMA circuit 40A. Namely, the processor 50 sends a predetermined device number DVN to the device number decoder 13A, delivers the transmission start address BGN = 1000, the transmission word number W = 1024, the buffer area top address TOP = 1000 and the bottom address BTM = 2023 of the buffer area, and sets this data into the address counter 4A, the word counter 5A, the address register 1A and the address register 2A, respectively, under control of the instruction decoder 10A. At this point it should be noted that the 1024 word capacity of the buffer area is conveniently an even multiple of the 256 word sector length of the terminal 30A so that the data transfer can be accomplished in four sectors.

When the setting of the data in the registers 1A and 2A and the counters 3A and 4A is completed, the processor 50 generates a start instruction of the DMA transmission to the DMA circuit 40, whereby the data transmission between the terminal 30A and the processor 50 is executed word by word via the data register 6A (one-word buffer). In other words, in response to this transmission start instruction, the data from the terminal 30A is stored word by word in the data register 6A in synchronism with the synchronizing signal CLK from the request signal generator 9A. After the one word of data is set in the data register 6A, the content of the address counter 4A is read and is delivered to the buffer 60 via the address bus. Subsequently, the one word of data read from the data register 6A is stored at the portion of the buffer 60 area corresponding to the above-mentioned address. Reading of the data from the address counter 4A and the data register 6A is effected in synchronism with the signals AR and DR from the processor 50, respectively.

The processor 50 first generates the signal AR in response to the signal REQ and then the signal DR after the passage of a predetermined period of time. Thereafter, the request signal generator 9A delivers the demand signal REQ in response to the clock signal TIM. On the other hand, the terminal 30A stores the one word of data in the data register 6A in response to the synchronizing signal CLK from the request signal generator 9A. The processor 50 likewise generates the signals AR and DR upon receiving the second and following signals REQ and allows the buffer memory 60 to store the data inside the data register 6A.

Whenever this one-word transmission is effected, the content of the address counter 4A is increased by 1 by the signal AR while the content of the word counter 5A is decreased by 1 by the signal DR.

When the content of the word counter 5A reaches zero, the data transmission of predetermined W words is completed. At this time, an interruption signal INT is delivered from the counter 5A to the processor 50 so that completion of the W-word data transmission is identified to the processor 50. At this time, too, an empty signal EMP representing the zero content of the word counter 5A is delivered by the word counter so that the request signal generator 9A stops delivering the signals CLK and REQ.

Thus, as shown in the portion indicated by oblique lines in FIG. 3(a), the 1024 words are stored in the region ranging from the addresses 1000 to 2023 of the buffer area.

(2) In response to the interruption signal INT from the word counter 5A, the processor 50 executes the data transmission to the DMA circuit 40B. Since the 1024 words are stored in the addresses 1000 to 2023 inside the buffer area 60 and since the sector length of the terminal 30B is 100, the processor 50 determines the transmission start address BGN=1000 and the transmission word number W=1000 for the DMA circuit 40B, 1000 words being the closest even multiple of the sector length of the terminal 30B to the capacity of the buffer area. It also determines the transmission end address END=1999.

The processor 50 executes the following processing for the DMA circuit 40B. Namely, it delivers to the DMA circuit 40B the transmission start address BGN=1000, the transmission word number W=1000 together with the top address TOP=1000 and the bottom address BTM=2023 of the buffer memory 60, via the data bus. The processor 50 likewise delivers the device number DVN designating the terminal 30B and the data set instruction to the device number decoder 13B and to the instruction decoder 10B, respectively, and stores the above-mentioned data in the address counter 4B, the word counter 5B, the address register 1B and the address register 2B, respectively.

Thereafter, the processor 50 delivers the transmission start instruction to the DMA circuit 40B. In accordance with the principle described already, the DMA circuit 40B delivers the transmission demand signal REQ from its request signal generator 9B and in response to this signal REQ, the processor 50 delivers the address read signal AR and the data write signal DW to the address counter 4B, the data counter 6B and the word counter 5B, respectively. In this manner, the one word of data designated by the address 1000 produced from the address counter 4B is read from the buffer area 60 and is stored in the data register 6B via the data bus. This data is transmitted to the terminal 30B in response to the synchronizing signal CLK. Thereafter, the address counter 4B is increased by 1 in response to the signal AR while the word counter 5B is decreased by one in response to the signal DW, thereafter followed by the data transmission word by word. When the value of the word counter reaches zero, the interruption signal INT is applied to the processor 50 from the word counter 5B in the same way as in the DMA circuit 40A.

In this manner, of the 1024-word data of the buffer memory 60, 1000 words from the address 1000 to the address 1999 are transmitted to the terminal 30B, as shown in FIG. 3(b). The 24-word data from the address 2000 to the address 2023 remain as the data that is not yet transmitted. This is because the sector length of the terminal 30B is 100-word. In other words, [1024/100]×100=1000 words of data is transmitted to the terminal 30B, Here, the brackets [ ] represent the Gauss sign.

(3) Among the buffer area, the addresses from 2000 to 2023 remain as the data that is not yet transmitted. The region other than these addresses, i.e., the 1000-word region from the address 1000 to the address 1999, is used as the buffer area for inputting the data from the terminal 30A. However, since the sector length of the terminal 30A is 256-words, the words that are practically used among the above-mentioned 1000 words are 768 words (=[1000/256]×256). That is to say, three sectors of 256 words represent the closest even multiple of the available storage space so that the data from the terminal A is taken into the addresses 1000 to 1767 of the data buffer memory. For this reason, the processor 50 designates the top address TOP=1000, the bottom address BTM=2023, the transmission start address BGN=1000 and the transmission word number W=768 to the DMA circuit 40A, thereby allowing the terminal 30A to transfer the data to the buffer area.

(4) After transmission of the data, the processor 50 executes the processing for transmitting the data of the address 2000 onwards of the buffer area 60 to the terminal 30B. The data from the addresses 2000 to 2023 and the data from the addresses 1000 to 1767 are continuous. Though 792 words of data in total are present in the data buffer area, only 700 words (=[792/100]×100) are transmitted at this time because the sector length of the terminal 30B is 100-words. In other words, the data from the addresses 2000 to 2023 and the data from the addresses 1000 to 1675, or 700 words of data in total, is transmitted to the terminal B. Accordingly, the processor 50 designates the top address TOP=1000, the bottom address BTM=2023, the transmission start address BGN=2000 and the transmission word number W=700 to the DMA circuit 40B.

In the same way as described already, the DMA circuit 40B transmits the data, word by word, from the buffer area to the terminal 30B. Upon transmission of one word, the content of the address counter 4B is delivered to the address bus in response to the signal AR and is increased by one after delivery. At the time before the content of the address counter 4B is delivered to the address bus AM, the content of the address counter 4B and the bottom address BTM are compared with each other by the comparison circuit 3B. After the content of this address counter 4B is delivered to the address bus AB in response to the signal AR and is used for the one-word data transmission, the address counter 4B is not increased if the output of the comparison circuit 4B indicates a coincidence, and stores the top address TOP inside the register 4B. Thereafter, the data transmission of word by word is repeated in the same way using the content of the address counter 4B. Namely, the content of the address counter 4B is continuously updated such as BGN, BGN+1, ..., BTM−1, BTM, TOP, TOP+1, . . . whenever the one-word transmission is effected after the start of the DMA transmission. When the data transmission of a predetermined W-word is completed, the interruption signal INT is delivered to the processor 50.

In this example, the data transmission is started from the transmission start address BGN=2000 and after the 24th-word of data is transmitted, the content of the address counter 4B is updated to the top address TOP=1000. Subsequently, when the data from this address to the address 1675 in the buffer area is transmitted, the interruption signal INT is produced from the DMA circuit 40B. Accordingly, as shown in FIG. 3(c), subsequent to the 24 words from the address 2000 to the address 2023, the 676 words from the addresses 1000 to 1675, or 700 words in total, are transmitted, and the 92 words from the addresses 1676 to 1767 remain as the data that is not yet transmitted.

(5) From the 932-word region of the addresses 1767 to 2023 and 1000 to 1675 of the buffer memory 60, the processor 50 calculates the word number W to be transmitted from the terminal 30A as [932/256]=768 and at the same time, designates the top address TOP=1000, the bottom address BTM=2023 and the transmission start address BGN=1768 to the DMA circuit 40A. The DMA circuit 40A reads the 768 words, one by one, from the terminal 30A and stores them in the buffer area 60. In this instance, if the comparison circuit 3A detects the coincidence of the content of the address counter 4A with the value BTM of the address register 2A, the value TOP of the address register 1A is set into the address register 4A and is used as the subsequent transmission address in the buffer area. The operation of the DMA circuit 40A in this case is the same as that of the DMA circuit 40B described in the item (4) except that the data transmitting direction is different. As a result, the 768 words of data in total are stored so as to continue the addresses 1768 to 2023 and to the addresses 1000 to 1511. In this manner, in the buffer area 60, 348 words from the addresses 1676 to 2023 and 512 words from the addresses 1000 to 1511, or 860 words in total, are stored as the data that is not yet transmitted, as shown in FIG. 3(e).

(6) The processor 50 designates the top address TOP=1000, the bottom address BTM=2023, the transmission start address BGN=1676 and the transmission word number W=[860/100]$_G$=800 to the DMA circuit 40B and instructs to start the 800-word data transmission. After transmitting the 348 words from the addresses 1676 to 2023, the DMA circuit 40B updates the value of the address counter 4A to TOP=1000 from the address register 1A and subsequently transmits, one by one, the 452 words of the addresses 1000 to 1451, or 800 words in total. In this manner, 60 words from the addresses 1452 to 1511 remain in the buffer area 60 as the data that is not transmitted, as shown in FIG. 3(f).

(7) When notified by the interruption signal INT of the fact that the 800-word transmission is completed by the DMA circuit 40B, the processor 50 recognizes that the data quantity that has already been transmitted from the terminal 30A to the buffer area 60 reaches the intended 2560 words. Accordingly, since there is no data to be subsequently transmitted from the terminal 30A to the buffer memory 60, the processor 50 designates the transmission word number W=60, the top address TOP=1000, the bottom address=2023 and the transmission start address BGN=1452 to the DMA circuit 40B in order to deliver the untransmitted data to the terminal 30B by means of the DMA circuit 40B, and to allow the DMA circuit to transmit the 60-word data.

In the abovementioned manner, the 2560-word data can be transmitted through the buffer area without moving the data.

What is claimed is:

1. A direct memory access control circuit for controlling the transfer of data between a first terminal capable of handling data in units of a first block length of plural words and a second terminal capable of handling data in units of a second block length of plural words via a region of a memory having a first boundary address and a second boundary address, said second block length being different from said first block length, bus means including an address bus and a data bus which connects said memory to a processor and wherein access to said region of said memory by said first or second terminal is controlled by said direct memory access control circuit via said address bus without intervention of said processor, said first and second terminals being connected to said memory via said bus means, said direct memory access control circuit comprising: first memory means connected to said data bus for storing only said first boundary address of said region of said memory; second memory means connected to said data bus for storing only said second boundary address of said region of said memory; third memory means connected to said address bus and said data bus for storing a beginning address received from said processor via said data bus and for delivering the stored contents thereof to said address bus in order to access said region of said memory; comparison means for comparing the content of said second memory means with that of said third memory means; wherein said third memory means includes updating means connected to said first memory means and said comparison means for updating the memory content of said third memory means, whenever access to said memory is made, in such a fashion that when the output of said comparison means does not represent coincidence between the content of said second memory means and the content of said third memory means, the content of said third memory means is changed by a predetermined amount, and when the output of said comparison means represents a coincidence, the content of said third memory means is made equal to said first boundary address in said first memory means; fourth memory means for storing the word number applied thereto from said processor as an initial value and including means for effecting a counting down of said word number by a predetermined number whenever access to said memory is made, said access to said memory being stopped when said word number is decremented to zero, wherein said initial value of said word number is equal to the maximum integral number of said units of said first or said second block length which can be accommodated in an area which is less than the size of a remaining usable area of said memory determined in accordance with said first and second boundary addresses and data held in said region; and means for controlling the storing of address information, provided from said processor via said data bus, into said first, second, third and fourth memory means in response to a predetermined instruction from said processor.

2. A direct memory access control circuit as defined in claim 1, further including fourth memory means connected to said data bus for storing a word number designating the number of words of data to be sequentially transferred to said region of said memory from one of said first and second terminals, and data transfer means connected to said data bus for effecting sequential transfer of data words between said region of said memory and one of said first and second terminals, said updating means including means for decrementing the content of said fourth memory means whenever a data word is transferred between said region of said memory and said one terminal, said fourth memory means including means for applying an inhibit signal to said data transfer means to stop the transfer of data words when the content of said fourth memory means is decremented to zero.

3. A data processing system comprising a processor; a memory having a region between a first boundary address and a second boundary address for storing data; first and second direct memory access control circuits; bus means including a data bus and an address bus for connecting said processor, said memory and said direct memory access control circuits to one another; and first and second data sources connected to said first and second direct memory access control units, respectively, via said bus means, said first data source being capable of handling data in units of a first block length of plural words and said second data source being capable of handling data in units of a second block length of plural words, said second block length being different from said first block length; and in which system the data transmission between said first and second data sources is effected under control of said first and second direct memory access control circuits and via said region inside said memory, said processor including means for determining the size of a remaining working area in said region of said memory from said first and second boundary addresses and data held in said region and means for producing a word number equal to the maximum integral number of said units of said first or said second block length which is less than said size of said remaining working area, each of said first and second direct memory access control circuit including: first and second means connected to said data bus for storing said first and second boundary addresses of said region of said memory received via said data bus, respectively; third means connected to said address bus and said data bus for storing a transmission start address received from said data bus as an initial value and for applying the stored content thereof to said address bus to make access to said region of said memory via said address bus for reading data from or storing data in said memory; fourth means connected to said third means for causing the memory content of said third means to be applied to said memory via said address bus for effecting a memory access; first means connected to said data bus for storing said word number equal to the number of words corresponding to an integral number of units of a block length of the data source from which data is to be transmitted to said memory or to which data is to be transferred from said memory, said fifth means being connected to said processor via said data bus for storing the word number applied thereto from said processor as an initial value and including means for effecting a counting down of said word number by a predetermined number whenever access to said memory is made; sixth means connected to said second and third means for comparing the memory contents of said second and third means with each other; and timing means responsive to said processor for actuating said fourth means during successive memory access cycles until the word number stored in said fifth means is decremented to zero; said fourth means including means connected to said first means and said comparison means for changing the stored content of said third means whenever access to said memory is made, in such a fashion that when the output of said comparison means does not represent a coincidence, the memory content of said third means is incremented and when the output of said comparison means represents a coincidence, the memory content of said third means is made equal to said first boundary address stored in said first means.

4. A method for direct memory access control of the transmission of data words between first and second terminals having different block lengths via a predetermined storage area having top and bottom addresses, comprising the steps of (a) storing said top address;
(b) storing said bottom address;
(c) storing as a starting address the address of a storage location forming part of said predetermined storage area;
(d) storing a word number as an initial value, said word number being equal to the maximum integral number of respective units of said different block lengths which can be accommodated in an area which is less than the size of the remaining usable area of the memory determined in accordance with said top and bottom addresses and data held in said region;
(e) effecting transfer of a data word to or from said predetermined storage area on the basis of said starting address;
(f) incrementing said starting address at the time of said data word transfer;
(g) comparing the incremented address with said stored bottom address;
(h) repeating steps (d) through (f) until coincidence is detected between said incremented address and said stored bottom address;
(i) then, replacing the incremented address with the stored top address; and
(j) repeating steps (e) and (f) until a total predetermined number of data words have been transferred from the time of transfer of the data word associated with said starting address.

5. A method according to claim 4, further including (k) storing a word numnber equal to the number of data words to be transferred at the time of storing said top and bottom addresses;
(l) decrementing said word number each time a data word is transferred according to step (e); and
(m) stopping step (j) when said word number becomes zero.

6. A direct memory access control circuit for controlling direct memory access by a data source to a data processing system, which includes a memory connected to a processor via bus means including an address bus and a data bus, and in which access to a predetermined region of said memory by said data source is effected under control of said direct memory access control circuit via said bus means without intervention of said processor, said direct memory access control circuit comprising:

first storage means connected to said data bus for receiving from said processor and storing a first boundary address of said predetermined region of said memory;

second storage means connected to said data bus for receiving from said processor and storing a second boundary address of said predetermined region of said memory;

third storage means connected to said data and address buses for receiving from said processor and storing a memory access address for applying said memory access address to said address bus;

fourth storage means connected to said data bus for receiving from said processor and storing a word number equal to the number of words to be transmitted to or from said predetermined region of said memory, said word number being equal to the maximum integral number of said unit of said first or said second block length which can be accommodated in an area which is less than the size of a remaining usable area of the memory determined in accordance with said first and second boundary addresses and data held in said region;

data transfer means responsive to a start signal from said processor and connected to said data source and said data bus for effecting sequential transfer of data words to or from said predetermined region of said memory from said data source via said data bus;

updating means connected to said third and fourth storage means for incrementing the content of said third storage means whenever a data word is transmitted to said predetermined region of said memory from said data source;

comparator means connected to said second and third storage means for comparing the contents of said second and third storage means; and means responsive to said comparator means detecting a coincidence between the contents of said second and third storage means for replacing the content of said third storage means with the content of said first storage means.

7. A direct memory access control circuit for directly controlling the transfer of data between first and second terminals having different data sector lengths via a predetermined region of a memory which is connected to a processor via a data bus and an address bus, and in which access to said predetermined region of said memory by said terminals is effected via said data bus under control of said direct memory access control circuit without intervention of said processor, said direct memory access control circuit comprising:

first storage means connected to said data bus for receiving from said processor and storing a first boundary address of said predetermined region of said memory;

second storage means connected to said data bus for receiving from said processor and storing a second boundary address of said predetermined region of said memory;

third storage means connected to said data and address buses for receiving from said processor and storing a memory access address and for applying said memory access address to said address bus;

fourth storage means connected to said data bus for receiving from said processor and storing a word number designating the number of words to be transferred to said predetermined region of said memory from one of said first and second terminals, said word number being equal to the maximum number of whole data sector lengths of said one terminal which can be received in said predetermined region of said memory;

data transfer means responsive to generation of a start signal from said processor and connected to said one terminal for effecting sequential transfer of data words between said predetermined region of said memory and said one terminal via said data bus;

updating means connected to said third and fourth storage means for incrementing the content of said third storage means and decrementing the content of said fourth storage means whenever a data word is transferred between said predetermined region of said memory and said one terminal;

comparator means connected to said second and third storage means for comparing the contents of said second and third storage means; and means responsive to said comparator means detecting a coincidence between the contents of said second and third storage means for replacing the content of said third storage means with the content of said first storage means.

8. A direct memory access control circuit according to claim 7, wherein said fourth storage means includes means for applying an inhibit signal to said data transfer means to stop the transfer of data words between said one terminal and said memory and an interrupt signal to said processor when the content of said fourth storage means is decremented to zero to cause said processor to initiate transfer of data words between said predetermined region of said memory and the other of said first and second terminals.

9. A direct memory access control circuit for controlling the transfer of data between a first terminal capable of handling data in units of a first block length and a second terminal capable of handling data in units of a second block length different from said first block length via a region of a memory, said memory being connected to a processor via bus means including an address bus and a data bus and wherein access to said region of said memory by said first or second terminal is directly controlled by said direct memory access control circuit via said bus means without intervention of said processor, said first and second terminals being connected to said memory via said data bus and at least one data register, said direct memory access control circuit comprising: first memory means connected to said data bus for storing only a first boundary address of said region of said memory; second memory means connected to said data bus for storing only a second boundary address of said region of said memory; third memory means connected to said address bus and said data bus for storing an address received from said processor via said data bus and for delivering the stored contents thereof to said address bus in order to make access to said region of said memory; fourth memory means for storing the word number applied thereto from said processor as an initial value and including means for effecting a counting down of said word number by a predetermined number whenever access to said memory is made, said access to said memory being stopped when said word number is decremented to zero, wherein said initial value of said word number is equal to the maximum integral number of said unit of said first or said second block length which can be accommodated in an area which is less than the size of a remaining usable area of the memory determined in accordance with said first and second boundary addresses and data held in said region; comparison means for comparing the content of said second memory means with that of said third memory means; wherein said third memory means includes updating means connected to said first memory means and said comparison means for updating the memory content of said third memory means, whenever access to said memory is made, in such a fashion that when the output of said comparison means does not represent coincidences between the content of said second memory means and the content of said third memory means, the content of said third memory means is changed by a predetermined amount, and when the output of said comparison means represents a coincidence, the content of said third memory means is made equal to said first boundary address in said first memory means.

10. A data processing system comprising a processor; a memory; first and second direct memory access control circuits; bus means including a data bus and an address bus for connecting said processor, said memory and said direct memory access control circuits to one another; and first and second data sources connected to said memory for transmitting data to said memory and for receiving data therefrom, said first data source being capable of handling data in units of a first block length of plural word and said second data source being capable of handling data in units of a second block length of plural word, said second block length being different from said first block length; and in which system the data transmission between said first and second data sources is effected under the control of said first and second direct memory access control circuit and via a region inside said memory, each of said first and second direct memory access control circuits including: first and second means connected to said data bus for storing first and second limit addresses of said region of said memory received via said data bus, respectively; third means connected to said address bus and said data bus for storing a transmission start address received from said data bus as an initial value and for applying the stored content thereof to said address bus to make access to said region of said memory via said address bus for reading data from or storing data in said memory; fourth means connected to said third means for causing the memory content of said third means to be applied to said memory via said address bus for effecting a memory access; fifth means connected to said data bus for storing a word number equal to the number of words corresponding to an integral number of block lengths of the data source from which data is to be transmitted to said memory or to which data is to be transferred from said memory, said fifth means being connected to said processor via said data bus for storing the word number applied thereto from said processor as an initial value and including means for effecting a counting down of said word number by a predetermined number whenever access to said memory is made, said word number being equal to the maximum integral number of said units of said first or said second block length which can be accommodated in an area which is less than the size of a remaining usable area of the memory determined in accordance with said first and second boundary addresses and data held in said region; sixth means connected to said second and third means for comparing the memory contents of said second and third means with each other and timing means responsive to said processor for actuating said fourth means during successive memory access cycles until the word number stored in said fifth means is decremented to zero; said fourth means including means connected to said first means and said comparison means for changing the stored content of said third means whenever access to said memory is made, in such a fashion that when the output of said comparison means does not represent a coincidence, the memory content of said third means is incremented and when the output of said comparison means represents a coincidence, the memory content of said third means becomes equal to said first limit address stored in said first means.

11. A direct memory access control circuit for controlling direct memory access by a data source with a data processing system which includes a memory connected to a processor via an address bus and a data bus, and in which access to a predetermined region of said memory by said data source is directly effected under control of addresses provided by said direct memory access control circuit to said memory via said address bus so that data may be transferred betwen said data source and said memory via said data bus, said direct memory access control circuit comprising:

first storage means connected to said data bus for receiving from said processor and storing a first boundary address of said predetermined region of said memory;

second storage means connected to said data bus for receiving from said processor and storing a second boundary address of said predetermined region of said memory;

third storage means connected to said data and address buses for receiving from said processor and storing a memory access address for applying said memory access address to said address bus;

fourth storage means connected to said data bus for receiving from said processor and storing a word number equal to the number of words to be transmitted to said predetermined region of said memory, said word number being equal to the maximum integral number of said units of said first or said second block length which can be accommodated in an area which is less than the size of a remaining usable area of the memory determined in accordance with said first and second boundary address and data held in said region;

data transfer means responsive to a start signal from said processor and connected to said data source and said data bus for effecting sequential transfer of data words to said predetermined region of said memory from said data source via said data bus;

updating means connected to said third and fourth storage means for incrementing the content of said third storage means and decrementing the content of said fourth storage means whenever a data word is transmitted to said predetermined region of said memory from said data source;

comparator means connected to said second and third storage means for comparing the contents of said second and third storage means; and means responsive to said comparator means detecting a coincidence between the contents of said second and third storage means for replacing the content of said third storage means with the content of said first storage means.

12. A method for direct memory access control of the transmission of data words between first and second terminals having different sector lengths via a predetermined storage area having top and bottom addresses, comprising the steps of (a) storing said top address;
(b) storing said bottom address;
(c) storing as a starting address the address of a storage location forming part of said predetermined storage area;
(d) effecting transfer of a data word to or from said predetermined storage area on the basis of said starting address;
(e) incrementing said starting address at the time of said data word transfer;
(f) comparing the incremented address with said stored bottom address;
(g) repeating steps (d) through (f) until coincidence is detected between said incremented address and said stored bottom address;
(h) then, replacing the incremented address with the stored top address;
(i) repeating steps (d) and (e) until a total predetermined number of data words have been transferred from the time of transfer of the data word associated with said starting address;
(j) storing a word number euqal to the number of data words to be transferred at the time of storing said top and bottom addresses, including selecting said word number for storing which is an integral number times the sector length of the terminal from or to which data words are to be transferred and which is equal to or less than the available word storage capacity of said predetermined storage area;
(k) decrementing said word number each time a data word is transferred according to step (d); and
(l) stopping step (i) when said word number becomes zero.

13. A direct memory access control circuit for controlling the transfer of data between a first terminal capable of handling data in units of a first block length of plural words and a second terminal capable of handling data in units of a second block length of plural words via a region of a memory having a first boundary address and a second boundary address, said second block length being different from said first block length, bus means including an address bus and a data bus which connects said memory to a processor and wherein access to said region of said memory by said first or second terminal is controlled by said direct memory access control circuit via said address bus without intervention of said processor, said first and second terminals being connected to said memory via said bus means, said direct memory access control circuit comprising: first memory means connected to said data bus for storing only said first boundary address of said region of said memory; second memory means connected to said data bus for storing only said second boundary address of said region of said memory; third memory means connected to said address bus and said data bus for storing a beginning address received from said processor via said data bus and for delivering the stored contents thereof to said address bus in order to access said region of said memory; comparison means for comparing the content of said second memory means with that of said third memory means; wherein said third memory means includes updating means connected to said first memory means and said comparison means for updating the memory content of said third memory means, whenever access to said memory is made, in such a fashion that when the output of said comparison means does not represent coincidence between the content of said second memory means and the content of said third memory means, the content of said third memory means is changed by a predetermined amount, and when the output of said comparison means represents a coincidence, the content of said third memory means is made equal to said first boundary address in said first memory means; fourth memory means connected to said data bus for storing a word number designating the number of words of data to be sequentially transferred to said region of said memory from one of said first and second terminals, and data transfer means connected to said data bus for effecting sequential transfer of data words between said region of said memory and one of said first and second terminals, said updating means including means for decrementing the content of said fourth memory means whenever a data word is transferred between said region of said memory and said one terminal, said fourth memory means including means for applying an inhibit signal to said data transfer means to stop the transfer of data words when the content of said fourth memory means is decremented to zero; and means for controlling the storing of address information, provided from said processor via said data bus, into said first, second, third and fourth memory means in response to a predetermined instruction from said processor; wherein said fourth memory means is connected to said processor via said data bus to receive and store a word number which is equal to the maximum number of whole units of the block length of the terminal sending or receiving data which can be accommodated in an available portion of the region of said memory, so that upon transfer of data to said memory sufficient empty storage space will be available to accommodate said transfer, and upon transfer of data from said memory, sufficient data will be present in said memory to accommodate the unit block length of the terminal involved in the respective transfer.

* * * * *